Dec. 22, 1942.  E. WITTNER  2,305,822
BRAKE SYSTEM AND DEVICE
Filed Oct. 12, 1939   3 Sheets-Sheet 1

Inventor:
Erich Wittner
by Richardson
Attys.

Dec. 22, 1942.  E. WITTNER  2,305,822
BRAKE SYSTEM AND DEVICE
Filed Oct. 12, 1939    3 Sheets-Sheet 2
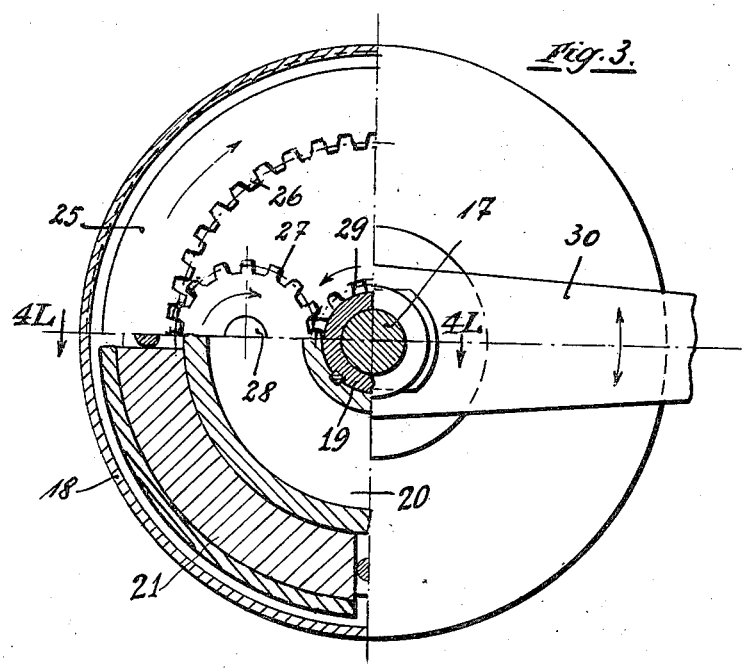
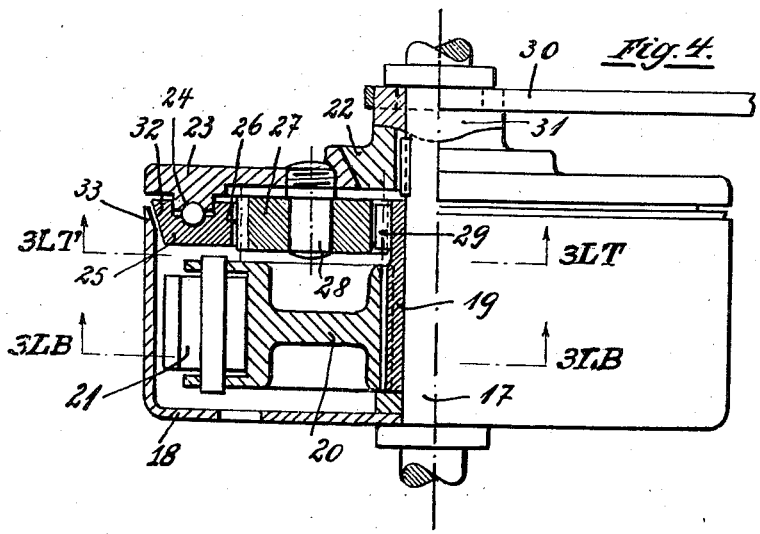
Inventor:
Erich Wittner
by Richardson
Attys.

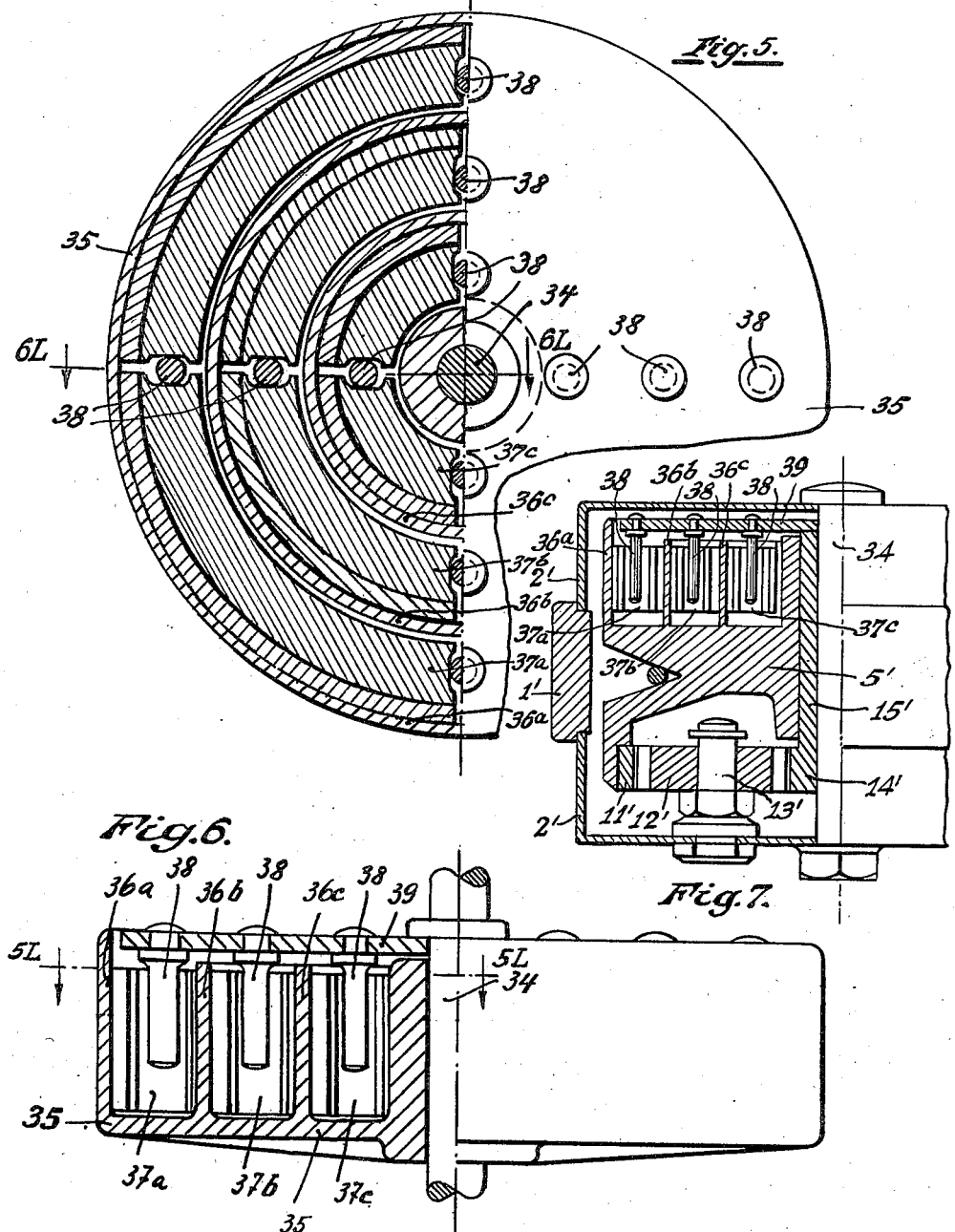

Patented Dec. 22, 1942

2,305,822

UNITED STATES PATENT OFFICE 2,305,822

BRAKE SYSTEM AND DEVICE

Erich Wittner, Schwenningen - on - the - Neckar, Germany; vested in the Alien Property Custodian Application October 12, 1939, Serial No. 299,154
In Germany October 8, 1939

8 Claims. (Cl. 188—185)

This invention relates to a new and improved brake system, and is particularly concerned with a brake device comprising a control member rotating in a direction opposite to the rotation of a brake drum and controlling in turn the actuation of brake members responsive to centrifugal force caused by the speed or R. P. M. of the brake drum, or rather to say, dependent on the speed of the vehicle or other apparatus or machinery the speed of which is to be controlled.

Brake systems that may be recalled for supporting the understanding of the present invention include devices wherein brake blocks or segments are actuated against rotating plates or disks, the actuation being obtained through hand- or foot-operated means, magnetically, hydraulically, or with other suitable mechansims, depending on the particular structure and purpose involved in any one device of this class. Other structures, so-called hub-brakes, comprise cone-shaped brake members which are movable along the shaft or hub of a rotating body to bring about the desired brake action. Still other prior systems utilize the centrifugal force of a brake member which is pressed against a brake surface depending on the speed or R. P. M. of the mechanism to be governed.

In each of these previously known devices, only one of the two bodies which are to be brought into frictional brake engagement or brake relation is movable, while the other is relatively fixed or stationary. The brake effect is consequently limited, with the ever present danger that blocking may occur and damage the brake and even the entire mechanism.

The structure and operation of the brake devices disclosed herein yield an appreciably greater brake effect or force than those known before, and avoid the blocking with certainty by an arrangement wherein centrifugal members which are connected to and rotate with a brake body, for example, a brake drum, act automatically against the same, depending on the speed or R. P. M. of the drum. These members are mounted radially movable on a control or guide member which is driven by the drum in opposite direction thereto and at higher speed than the drum.

This arrangement of oppositely rotating brake bodies which are movably mounted so that they can respond to centrifugal force, yields a very considerably greater brake action because the relative speed obtaining between the two coacting friction members (for example, the brake drum and the brake bodies) is correspondingly increased, and the period for which the brake bodies are operatively active during a time unit is also correspondingly lengthened.

Another advantage of the new arrangement which utilizes centrifugal force for effecting the brake engagement consists in the automatic increase in the brake effect during periods of increased speed, for example, while a vehicle is running downhill, or during the downward travel of a suspension railway car, an elevator or hoist or the like, or during the lowering of a load in case of a block and tackle apparatus—in short, when the machinery to be controlled has a tendency to exceed the desired or permissible speed limit.

The new brake may be adjusted to a maximum brake load or action according to the purpose for which it is to be used, and an additional or cumulative brake action may be released and applied by the operation of a brake lever, until the vehicle or load has come to a complete stop. The brake may also be pre-set for certain action or for particular operations, and may thus be adapted to variable requirements to a far-reaching extent.

The new brake may be equipped with hub or axle brakes, or plate brakes and the like, in addition to the centrifugal brake means, to increase the brake action, and the action of all brake means may be controlled from a single point. The arrangement may be carried out in such a manner that a slight pull or actuation of the brake lever releases the operation of the centrifugal brake means and subsequently brings into play the additional brake provisions upon further actuation of the brake lever, or vice versa. A simultaneous actuation of these brake means is likewise possible.

The connection between the body upon which the brake force should be applied and the control or guide member which rotates in opposite direction thereto and governs the centrifugal brake means is preferably obtained by the provision of a transmission having a suitable gear, for example, a spur gear which is actuated by a coupling operated from the brake lever. The same brake lever may also be utilized for releasing the actuation of the additional brake mechanisms.

The entire arrangement may be made wholly symmetrical with all brake members mounted on a single shaft or axle and wherein the brake action takes place in an identical manner in each direction of operation, that is, in forward and in reverse directions of the vehicle or mechanism that is to be controlled.

When used in a vehicle the new brake system yields a completely uniform action, for example, on all four wheels, since it is wholly independent of any transmission including links, or other coordinating means, and likewise independent of an accurate uniform adjustment of the brake bodies.

Certain embodiments that may be made in accordance with the invention are shown in more or less diagrammatic form in the attached drawings which, however, do not exhaust all the possible combinations for applying the invention in practice. The symbols along the sectional lines locate the respective sections; for example, 1L—1L means that the section is shown in Fig. 1 at the left; 1R—1R means that the section is shown in Fig. 1 at the right; 3LT means that the section is shown in Fig. 3 at the left and on top thereof; and 3LB means that the section is shown in Fig. 3 at the left and bottom thereof. With these remarks in mind these and other symbols on the sectional lines in the drawings will be easily understood.

Fig. 3 shows diagrammatically another embodiment of the invention—at the left a section along the lines 3LT—3LT and 3LB—3LB of Fig. 4, and at the right and end view;

Fig. 4 shows at the left a section along the line 4L—4L of Fig. 3, and at the right a plane view;

Fig. 5 indicates at the left a section along line 5L—5L in Fig. 6 and at the right an end view of an embodiment utilizing a multiple centrifugal force action; Fig. 6 represents at the left a section along line 6L—6L in Fig. 5 and at the right a plane view of the embodiment Fig. 5; and Fig. 7 shows the structure of Figs. 5 and 6 more in detail, at the left in section and at the right in plane view.

Figure 1:
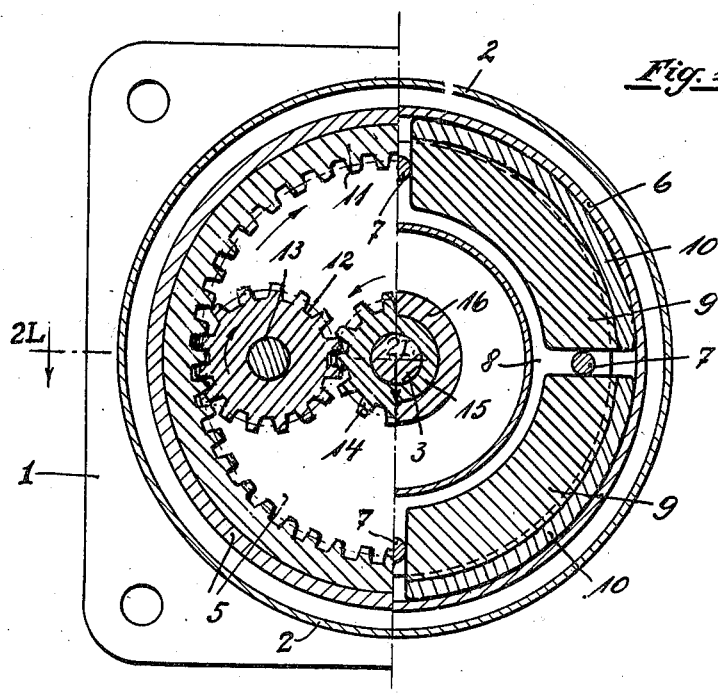
Fig. 1 shows at the left a diagrammatic vertical section along the line 1L—1L of Fig. 2, and on the right side a section along the line 1R—1R of Fig. 2.
Figure 2:
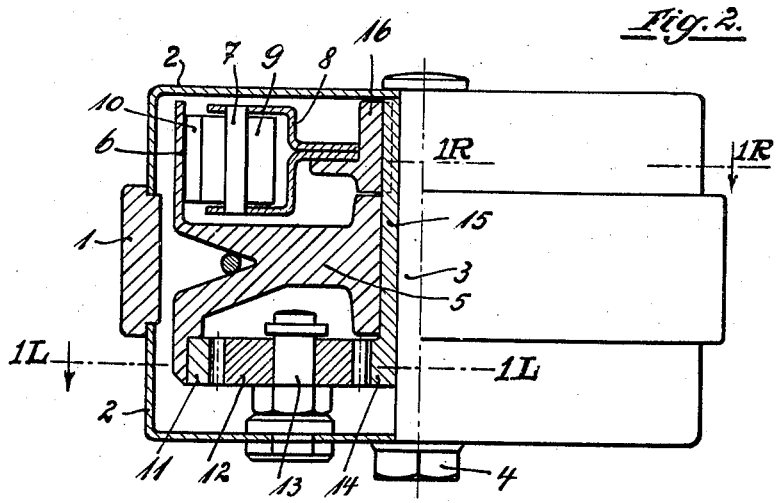
Fig. 2 shows at the left a section along the line 2L—2L of Fig. 1, and at the right a plane view of Fig. 1.

The high power brake, as illustrated in Figs. 1 and 2, is of a relatively simple structure and may be mounted in a suitable housing. The housing comprises a central portion 1 which may be made in the form as shown and the two hoods 2 connecting with the central portion 1 through the shaft 3 and the nut 4, thus forming a unit therewith. Upon the shaft 3, or rather to say, upon a hollow shaft 15 which will be presently described, is provided the freely rotatable wheel 5 which may be formed as a pulley wheel, a belt pulley or a gear wheel or the like. As illustrated, the wheel is formed as a pulley having a peripheral groove for accommodating a suitable rope or cable or the like.

The driving wheel 5 carries a brake flange 6 containing a hollow cylindrical brake surface against which may be pressed the brake segments 9 provided with brake lining 10, the pressure action coming into play as a consequence of centrifugal force which moves these segments radially outwardly. The brake segments 9 are mounted on and guided by the bolts 7 arranged movably within the guide body 8 which is open at its outer end.

On the side opposite the brake flange 6 the drive wheel 5 is provided with an internal gear 11 which meshes with one or more intermediate gear wheels 12. The latter are rotatably mounted upon bolts 13 attaching to the housing. The wheel 12 meshes with a gear wheel 14 which is rigidly attached to the hollow shaft 15, the latter being rotatably mounted upon the shaft 3. On the other end of the hollow shaft 15 is provided the brake wheel 16 which is connected with the guide or control member 8 for the brake bodies subject to centrifugal force. There may be as many brake bodies 9 as is desirable or necessary.

This structure operates as follows:

Responsive to rotation of the drive wheel 5, the brake wheel 16 is rotated at a higher speed and in opposite direction thereto due to the action of the transmission including the gear wheels 11, 12, and 14. Beginning with a certain speed or R. P. M., the centrifugal bodies 9—10 are thrown outwardly against the inner brake surface of the brake flange 6 while they rotate in opposite direction thereto. The frictional engagement of these oppositely rotating members, that is, of the brake flange 6 and the centrifugal brake bodies 9—10 causes the brake action, with the result that the speed of the drive wheel 5 is correspondingly reduced. As already mentioned, this drive wheel may drive a belt or, as shown, a rope or cable, or may operate a gear wheel or any other drive for any suitable and desired purpose. Means may be provided for pre-setting or adjusting the mechanism so that the action of the centrifugal bodies is released at a predetermined speed. The brake action is initiated automatically when this speed is reached or exceeded, and is discontinued when normal speed is resumed. The brake force is automatically increased as the speed of the mechanism increases.

The embodiment shown in Figs. 3 and 4, among other forms of application, may also be used for a vehicle or airplane brake. The shaft 17 may be connected with the vehicle. Rotatably arranged thereupon are the brake drum 18 and the hollow shaft 19, and keyed upon the latter are the guide bodies 20 for the segment-like centrifugal brake members 21 carrying a suitable brake lining such as discussed in connection with the embodiments Figs. 1 and 2. Keyed upon the shaft 17 and thus prevented from turning, but movable thereon in axial direction, is the disk 22, forming a cone wheel which enters a correspondingly formed boring in the base plate 23, thus holding this plate against rotation. Ball bearings or rollers or the like are placed in a ring-shaped groove 24 of the base plate 23 supporting the brake ring 25. The latter is provided on the inside with a gear 26 which meshes with one or more intermediate gear wheels 27, the latter being rotatably mounted upon bolts 28 which are attached to the base plate 23. These intermediate gear wheels mesh with a pinion or gear 29 which is rigidly mounted on the hollow shaft 19.

If it is desired to actuate the above described brake, the lever 30 will be operated, in turn displacing the cam 31 which is connected thereto. The cam in turn presses against the conical disk 22 and thereby moves this disk and the base plate 23 in axial direction in such a manner that the brake ring 25 is also displaced and caused to engage or to be coupled with the surface 33 provided on the brake drum 18, the engagement being with the cone-shaped outer surface 32 on the brake ring 25. This action transmits the rotation of the drum 18 to the guide body 20 and the centrifugal brake members 21 carried thereby, rotating this guide and the brake members in a direction opposite to the rotation of the brake drum. Again, as in the previously described embodiment, the centrifugal bodies 21 will be brought into frictional engagement with the inside brake surface of the drum when a certain speed is reached or exceeded, and the previously described brake effect is accomplished with all the advantages resulting from the frictional engagement of two oppositely rotating bodies.

It may be mentioned at this point that the centrifugal bodies in this embodiment, as well as others described herein, may be of any desirable and suitable detailed structure with suitable and approved means for releasing their operation at any desired point of speed.

In Figs. 5 and 6 is shown an embodiment demonstrating how a structure can be made so as to multiply as desired the brake action of the centrifugal bodies. For the sake of simplicity these figures show only the centrifugal bodies with their guide or control members and the brake drum with its brake flanges.

Numeral 34 in Figs. 5 and 6 designates the shaft, 35 is the brake drum which is rotatable on this shaft, this brake drum being equipped in this case with three brake flanges 36a, 36b, and 36c. The number of brake flanges corresponds to the number of sets of centrifugal bodies 37a, 37b, 37c formed of segment-like parts which are secured by means of the bolts 38 and are radially movable. The bolts are fastened in the guide plate 39 and this plate may be caused to rotate in a direction contrary to the direction of rotation of the brake drum by the operation of a brake lever, as previously described. Again, as in the examples already explained, the centrifugal bodies 37a, 37b, 37c, rotating with the brake plate 39 in opposite direction to the rotation of the brake drum 35, will engage the brake flanges 36a, 36b, 36c when a certain speed is reached or exceeded and exercise the previously explained brake effect. The centrifugal bodies may be adjusted so as to respond operatively when any certain speed is reached or exceeded.

Fig. 7 illustrates diagrammatically the manner in which the driving mechanism shown in Fig. 2 may be used in a structure such as discussed in connection with Figs. 5 and 6. Parts which are identical with those in Fig. 6 are identically marked, while parts corresponding to details shown in Fig. 2 are indicated by numerals as they appear in Fig. 2, except that they are primed in Fig. 7.

The shaft 34 in Fig. 7 holds the housing shells or hoods which engage the central portion 1'. A hollow shaft 15' is rotatably mounted on the shaft 34, and rotatably mounted thereon is the wheel 5'. This wheel on one side carries a plurality of brake flanges 36a, 36b, 36c shown also in Figs. 5 and 6. On the other side, the wheel carries a flange (as in the structure Fig. 2) which is provided with an internal gear 11'. The sleeve 15' carries an external gear 14' corresponding to the identically marked, but unprimed, gear 14 in Fig. 2. A pinion gear 12' is shown intermediate the gears 11' and 14' and is rotatably mounted on the pin 13'. Attached to the hollow sleeve 15' is a brake device 39 (see also Fig. 6) which carries the guides 38. These guides carry the brake bodies 37a, 37b, 37c. The operation is exactly as described in connection with the structure Fig. 2, except that a plurality of brake members coact with a plurality of brake surfaces, as discussed in connection with Figs. 5 and 6. When the wheel 5' rotates, it will rotate the hollow shaft or sleeve 15' through the medium of the gears 11', 12' and 14' in opposite direction and at greater speed. The member 39 carrying the brake bodies 37a, 37b and 37c is thus rotated with the hollow shaft, and these brake bodies are moved by centrifugal force against the oppositely rotating brake surfaces 36a, 36b, 36c projecting from the wheel 5'. The frictional engagement of the brake bodies with the brake surfaces slows up the wheel 5'.

What is believed to be new and desired to have protected by Letters Patent of the United States is defined in the appended claims.

I claim as my invention:

1. In combination, a shaft, a hollow shaft rotatably directly journalled thereon, a wheel rotatably journalled on said hollow shaft, a brake flange on said wheel constituting a brake drum having an internal brake surface, a brake device disposed on said hollow shaft within the space defined by said brake flange, said brake device comprising a carrier member keyed to said hollow shaft, guide members radically extending from said carrier member, brake bodies carried by said guides and radially movable with respect thereto for effecting brake engagement with said brake surface responsive to centrifugal forces resulting from rotation of said hollow shaft and said carrier member, and gear means operable by said wheel for rotating said hollow shaft at a speed higher than its own and in a direction opposite to its own direction of rotation.

2. In combination, a shaft, a brake drum rotatable therewith, a hollow shaft rotatably journalled directly on said shaft, a brake wheel keyed to said hollow shaft and rotatable therewith, guide members carried by said brake wheel and extending radially therefrom, brake bodies carried by said guide members and radially movable thereon for effecting brake engagement with said rotating brake drum responsive to centrifugal forces resulting from rotation of said hollow shaft and said brake wheel, gear means for rotating said hollow shaft and said brake wheel to rotate said brake bodies in a direction opposite to the direction of rotation of said brake drum and at greater speed than the speed of the brake drum so as to impart said centrifugal forces to said brake bodies for effecting brake engagement thereof with said brake drum, coupling means for operating said gear means directly from said brake drum, and actuating means for operating said coupling means.

3. The structure and combination defined in claim 2, wherein an internally toothed gear ring meshing with said gear means constitutes said coupling means, together with means journalled on said shaft for operating said actuating means to effect driving engagement of said gear ring with said brake drum.

4. In combination, a central shaft, a hollow sleeve rotatably journalled on said shaft, a wheel rotatably journalled on said sleeve, a brake flange extending from said wheel on one side thereof coaxial with said sleeve, a brake device keyed to said hollow sleeve comprising a plurality of brake bodies which are radially movable for brake engagement with the inside of said brake flange responsive to centrifugal force imparted thereto incident to rotation of said sleeve and the brake device keyed thereto, a flange carrying an internal gear extending from said wheel on the other side thereof, a gear carried by said sleeve, and intermediate gear means meshing with said flange gear and said sleeve gear for rotating said sleeve and said brake device responsive to rotation of said wheel in a direction opposite to the rotation of said wheel and at a higher speed.

5. In combination, a central shaft, a rotatable brake drum having a brake surface disposed coaxial with but radially spaced from said shaft, a hollow sleeve rotatably journalled on said shaft, a gear on said sleeve at one end thereof, a disk carrying a pinion gear which meshes with said sleeve gear and an internally toothed gear ring which meshes with said pinion gear, actuating means on said shaft for axially moving said disk to establish driving engagement between said gear ring and said brake drum to rotate said sleeve through the medium of said gears in a direction opposite to the direction of rotation of the brake drum and at a greater speed than the brake drum, and brake bodies carried by said sleeve and rotatable therewith which move radially into brake engagement with said brake surface responsive to centrifugal forces resulting from the rotation of said sleeve.

6. A brake device comprising a rotatable body carrying a brake surface which is rotatable therewith, a rotatable member carrying guides radially extending therefrom in the direction of said brake surface, a hollow shaft for carrying said rotatable member and for journalling said rotatable body, brake bodies carried by said guides which are radially movable with respect thereto for brake engagement with said brake surface solely responsive to centrifugal force applied thereto, and spur gears directly operable by said body for rotating said member and the guides and brake bodies thereon at a higher speed and in a direction opposite to its own direction of rotation for imparting to said bodies centrifugal forces to move said brake bodies into brake engagement with said rotating brake surface.

7. The device defined in claim 6, wherein said gears are normally disconnected from said body to prevent rotation of said member and the guides and brake bodies thereon, together with coupling means for engagement with said body to actuate said gears for rotating said member so as to impart centrifugal force to said brake bodies to effect radial displacement thereof for brake engagement with said brake surface.

8. A brake device comprising a rotatable body carrying a plurality of coaxially disposed radially separated flanges forming a like plurality of brake surfaces, a rotatable member carrying a plurality of guides, a hollow shaft for carrying said rotatable member and for journalling said rotatable body, brake bodies carried by said guides which are radially movable with respect thereto for brake engagement with said brake surfaces solely responsive to centrifugal force applied thereto, and spur gears directly operable by said body for rotating said member and the guides and brake bodies thereon at a higher speed and in a direction opposite to its own direction of rotation for imparting to said bodies centrifugal forces to move said brake bodies into brake engagement with said rotating brake surfaces.

ERICH WITTNER.